H. B. WHITE.
BOW REST AND CLAMPING DEVICE.
APPLICATION FILED MAR. 3, 1915.
1,222,057. Patented Apr. 10, 1917.
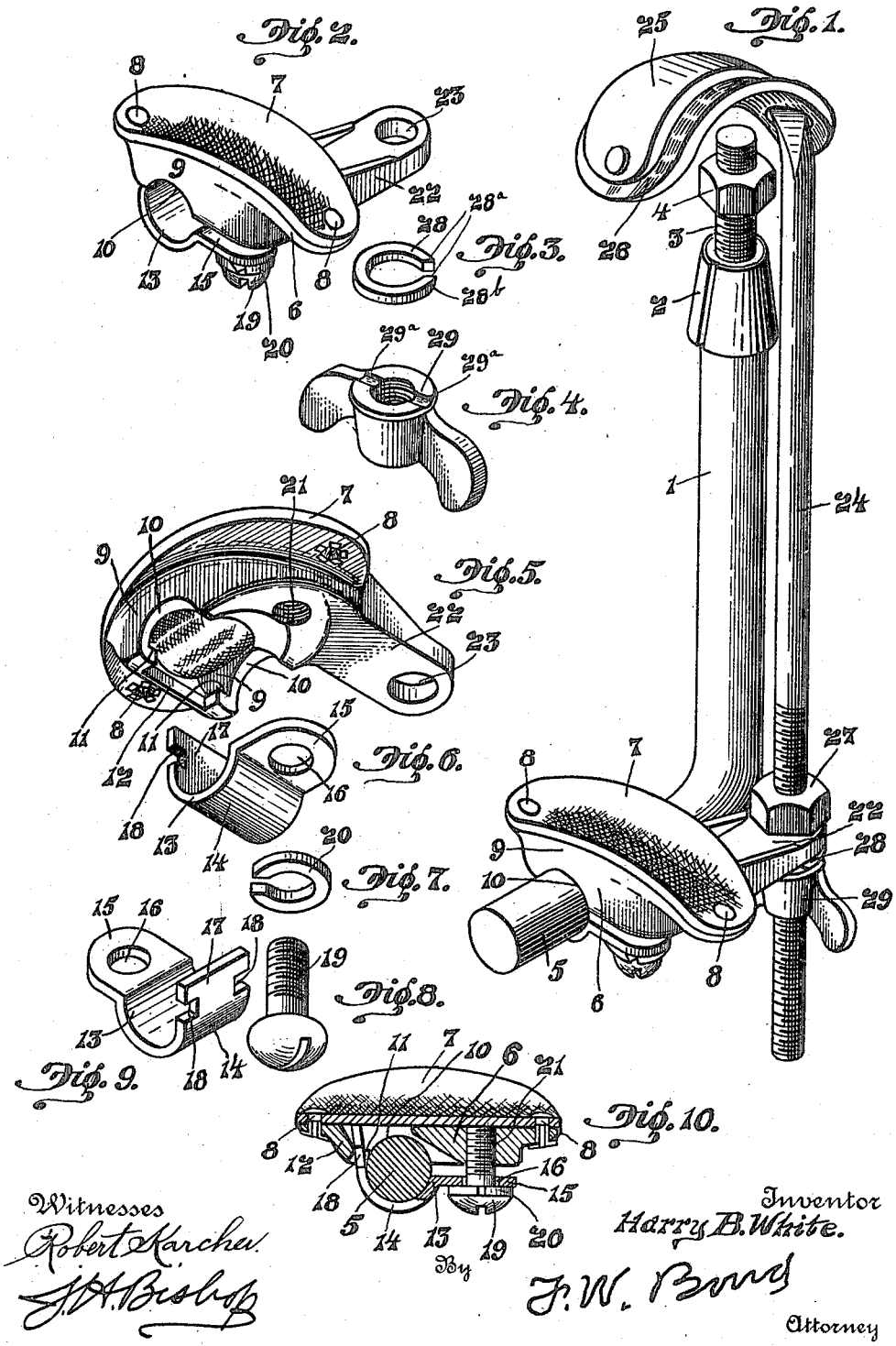
Witnesses
Robert Karcher
J. H. Bishop
Inventor
Harry B. White.
By F. W. Bond
Attorney

UNITED STATES PATENT OFFICE.

HARRY B. WHITE, OF CANTON, OHIO, ASSIGNOR TO THE GILLIAM MANUFACTURING COMPANY, OF CANTON, OHIO, A CORPORATION OF OHIO.

BOW REST AND CLAMPING DEVICE.

1,222,057.  Specification of Letters Patent.  Patented Apr. 10, 1917.

Application filed March 3, 1915. Serial No. 11,882.

*To all whom it may concern:*

Be it known that I, HARRY B. WHITE, a citizen of the United States, residing at Canton, in the county of Stark and State of Ohio, have invented a new and useful Bow Rest and Clamping Device, of which the following is a specification.

This invention relates to a device for supporting and clamping the bows of a vehicle top in a folded position.

The object of my invention is to provide an improved bow rest and clamping device which may be readily attached to a vehicle, which may be adjusted for folding tops of various sizes and which may be easily and readily adjusted laterally with relation to the body of the vehicle.

A further object is to provide a simple, inexpensive and efficient device of the character referred to.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

In the drawings:

Figure 1 is a perspective view of a bow rest embodying my invention.

Fig. 2 is a detail perspective view of the bracket which carries the rest member and upon which the clamp is mounted.

Fig. 3 is a detail perspective view of the split spring washer which is used in adjusting the clamp.

Fig. 4 is a detail perspective view of the wing nut which tightens the clamp.

Fig. 5 is a detail perspective view showing the under side of the bracket, the clamping plate being removed therefrom.

Fig. 6 is a detail perspective view of the clamping plate.

Fig. 7 is a detail perspective view of the split spring washer which is used in tightening the clamping plate.

Fig. 8 is a detail perspective view of the screw which connects the clamping plate and the bracket.

Fig. 9 is a detail perspective view showing the reverse side of the clamping plate.

Fig. 10 is a longitudinal section showing the bracket mounted upon the arm of the supporting rod.

Similar numerals of reference indicate corresponding parts throughout the several views of the drawing.

In the drawings 1 indicates the usual supporting rod which is connected to and depends from the ordinary bracket that is provided upon automobiles and other vehicles for the purpose of receiving said rod. The split conical collar 2 is mounted upon the reduced screw threaded portion 3 of the rod and together with the nut 4 is utilized for the purpose of attaching the supporting rod 1 to the usual bracket (not shown) upon the vehicle. It will, of course, be understood that the conical collar 2 may be used as shown in the drawings or may be inverted to accommodate different forms of brackets. As all of these parts are of the ordinary construction and have no specific bearing upon the invention disclosed herein it is not thought necessary to further describe these parts in detail.

The lower extremity of the supporting rod 1 is provided with a horizontal arm 5, which is preferably formed integrally with the rod 1. Adjustably mounted for lateral movement upon the arm 5 of the supporting rod is a bracket 6, the upper face of said bracket being channeled and covered with a pad 7 of leather or similar material which may be attached thereto, as by rivets 8, thus forming a rest upon which the lowermost bow of the top will be located when the top is in the folded position. A wall 9 is provided upon each side of the bracket upon the lower face thereof, said walls being formed concaved at 10 for the purpose of seating the bracket upon the arm 5, each of the walls 9 being provided at its lower extremity with an inwardly disposed shoulder 11, and an inwardly inclined, downwardly disposed end wall 12 connects the side walls 9.

The clamping plate 13 comprises the curved portion 14, the horizontal portion 15 provided with an aperture 16 and the substantially vertical portion 17 provided at each side with a notch 18. In order to clamp the bracket upon the arm 5, the clamping plate 13 is placed in the position shown in Fig. 10 of the drawings, the notches 18 therein registering with the shoulders 11, the upper portion 17 of the plate bearing against the flange 12. The screw 19 is then placed through the split spring washer 20 and through the aperture 15 in the clamping plate and is tightened within the screw threaded aperture 21 in the bracket, thus drawing the clamping plate and the concaved portions 10 of the bracket tightly against the arm 5 clamping the bracket firmly upon the arm. The split spring washer 20 normally exerts pressure between the head of the screw 19 and the horizontal portion 15 of the clamping plate tending to hold the clamping plate in engagement with the arm 5. When the screw 19 is loosened in order to laterally adjust the bracket 6 upon the arm 5 the tension upon the spring washer 20 will be lessened to such an extent that the bracket may be moved laterally upon the arm 5, but there will still remain enough tension upon the spring washer to hold the clamping plate in engagement with the arm 5, thus holding the several parts in their proper relative positions and preventing the bracket from turning upon the arm 5.

A laterally disposed arm 22 is provided upon the bracket 6, said arm being provided with an aperture 23 through which is located the screw threaded rod 24 upon the upper extremity of which is formed, the clamping member 25, the inner surface of which is provided with a pad 26 of the usual form and construction. For the purpose of connecting and clamping the rod 24 to the arm 22 the following means are provided, a suitable collar 27 preferably comprising a nut having screw threaded engagement with the rod 24 is adapted to form an abutment which engages with the upper surface of the arm 22, when the rod 24 is in the clamped position. A split spring washer 28 is placed upon the rod 24 against the lower surface of the arm 22 and a wing nut 29 is provided for the purpose of drawing the rod 24 and collar 27 downwardly, acting in opposition to the spring 28, thus effecting a locking operation of a well known type. The nut 27 determines the position of the clamp 25 with relation to the rest member 7 so that by adjusting the nut longitudinally upon the rod 24, the clamp 25 can be positioned and arranged so as to properly clamp the uppermost bow of the top when in the folded position.

The vibration of the car would ordinarily tend to cause the wing nut 29 to work loose upon the screw threaded rod 24 and in order to prevent this the split spring washer 28 is provided between the wing nut 29 and the arm 22 of the bracket as above mentioned. The open ends of the spring washer will tend to dig into the lower surface of the arm 22, especially when the wing nut is turned in a left hand direction. One of the lower open ends 28$^b$ of the split spring 28 is rounded so that it will not dig into the upper surface of the wing nut, but will slide freely over the top of the wing nut and keep a tension upon the same. The upper surface of the wing nut is provided with radial diametrically disposed grooves 29$^a$ adapted to register with the rounded open end 28$^b$ of the split spring washer every half revolution of the wing nut. When the rounded end 28$^b$ of the spring washer registers with one of the grooves in the wing nut it acts as a lock preventing the wing nut from working loose through vibration. When it is necessary to remove the nut, however, the rounded end of the split spring washer will rise out of the groove and ride upon the top face of the wing nut. It will be noted that the upper open ends 28$^a$ of the split spring washer are left sharp in order that they may dig into the underside of the bracket arm 22, causing the split spring washer to remain stationary and allowing the sliding action to take place between the upper surface of the wing nut and the rounded end 28$^b$ of the split spring washer.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claims.

I claim:

1. In a device of the character described, the combination of a supporting rod, a bracket mounted upon said supporting rod, downwardly disposed walls provided upon said bracket, said walls being provided with recesses adapted to contact with the upper side of the supporting rod, inwardly disposed shoulders provided upon said walls, a curved clamping plate provided with notches adapted to register with said shoulders, means for drawing the free end of said clamping plate toward said bracket, a rest provided upon the upper face of said bracket and arranged to support the bows of a vehicle top and a clamp carried by said bracket and arranged to coöperate with the rest to support the bows.

2. In a device of the character described the combination of a supporting rod, a bracket mounted upon said supporting rod, downwardly disposed walls provided upon said bracket, said walls being provided with recesses adapted to contact with the upper side of the supporting rod, inwardly disposed shoulders provided upon said walls, a curved clamping plate provided with a straight portion arranged to be placed between said shoulders, portions of said clamping plate arranged to rest upon said shoulders, means for drawing the free end of said clamping plate toward said bracket, a rest upon the upper face of said bracket arranged to support the bows of a vehicle top and a clamp carried by said bracket and arranged to coöperate with the rest to support the bows.

In testimony that I claim the above, I have hereunto subscribed my name in the presence of two witnesses.

HARRY B. WHITE.

Witnesses:
E. A. RIGGALL,
E. G. SONGSTAD.

Copies of this patent may be obtained for five cents each, by addressing the "Commissioner of Patents, Washington, D. C."